United States Patent
Oates et al.

(10) Patent No.: US 6,764,544 B2
(45) Date of Patent: Jul. 20, 2004

(54) PROCESS FOR INCORPORATING COAL ASH INTO CEMENT CLINKER

(75) Inventors: David Bridson Oates, Kettleby (CA); Alan Van Sloten, Rochester Hills, MI (US)

(73) Assignee: Lafarge Canada Inc., Quebec (CA)

( * ) Notice: Subject to any disclaimer, the term of this patent is extended or adjusted under 35 U.S.C. 154(b) by 0 days.

(21) Appl. No.: 10/328,070

(22) Filed: Dec. 23, 2002

(65) Prior Publication Data

US 2004/0118323 A1 Jun. 24, 2004

(51) Int. Cl.$^7$ .............................. C04B 7/48; C04B 7/12
(52) U.S. Cl. .................. 106/763; 106/705; 106/745
(58) Field of Search ............................... 106/705, 746, 106/763

(56) References Cited

U.S. PATENT DOCUMENTS

| | | | | |
|---|---|---|---|---|
| 4,004,938 A | * | 1/1977 | Rohrbach et al. | 106/760 |
| 4,081,285 A | * | 3/1978 | Pennell | 106/740 |
| 4,174,974 A | * | 11/1979 | Fondriest | 106/735 |
| 5,156,676 A | * | 10/1992 | Garrett et al. | 106/745 |
| 5,421,880 A | | 6/1995 | Young | |
| 5,494,515 A | | 2/1996 | Young | |
| 5,650,005 A | * | 7/1997 | Kistler | 106/748 |
| 5,837,052 A | * | 11/1998 | Oates et al. | 106/705 |
| 5,853,474 A | * | 12/1998 | Hilton | 106/697 |

FOREIGN PATENT DOCUMENTS

| EP | 0041269 A1 | * | 6/1981 |
|---|---|---|---|
| GB | 2198508 | * | 6/1988 |
| JP | 59-128239 A | * | 7/1984 |

OTHER PUBLICATIONS

Derwent Patent Abstract No. 1979–23563B, abstract of Soviet Union Patent Specification No. 604840 (Apr. 1978).*

Derwent Patent Abstract No. 1983–41235K, abstract of Soviet Union Patent Specification No. 937390 (Jun. 1982).*

Derwent Patent Abstract No. 1983–58288K, abstract of Soviet Union Patent Specification No. 947118 (Jul. 1982).*

Derwent Patent Abstract No. 1994–261265, abstract of Korean Patent Specification No. 9308086 (Aug. 1993).*

* cited by examiner

*Primary Examiner*—Anthony J. Green
(74) *Attorney, Agent, or Firm*—Bachman & LaPointe, P.C.

(57) ABSTRACT

A method of cement clinker manufacture comprises feeding a clinker feed material containing a source of calcium carbonate into a feed end of a cement kiln, the feed material is heat processed in the kiln to produce cement clinker with emission of carbon dioxide from thermal decomposition of said source of calcium carbonate and discharge of the carbon dioxide from the kiln, and cement clinker is discharged from a discharge end of the kiln; a coal ash derived from burning pulverized lignite or sub-bituminous coal is included in the feed material fed into the feed end to replace a portion of the source of calcium carbonate, and provides a source of calcium as well as other components notably silicon and aluminum, in the formation of the cement clinker, with a lowering of the emission of carbon dioxide in the kiln, per unit weight of cement clinker produced.

16 Claims, 1 Drawing Sheet

PROCESS FOR INCORPORATING COAL ASH INTO CEMENT CLINKER

BACKGROUND OF THE INVENTION

1. Technical Field

This invention relates to a process for producing a cement clinker having a content of coal ash as a source of calcium in the feedstock introduced into the cement kiln; more especially the invention is concerned with such a process in which the coal ash is derived predominantly from lignite and sub-bituminous coal sources. The fly ash component of this type of coal ash is referred to as Class C.

2. Description of the Prior Art

In a cement plant, cement clinker is created at elevated temperatures in a cement kiln from cement clinker raw ingredients which travel through the kiln from a feed end to a discharge end, while passing through different processing zones at elevated temperature. These processing zones include a calcining and a clinkering or burning zone.

Cement clinker comprises various cement compounds formed from the raw ingredients, for example dicalcium silicate, tricalcium silicate, tricalcium aluminate and tetra-calcium aluminoferrite. Formation of these cement compounds requires sources of calcium, silicon, aluminium hand iron in the raw ingredients fed to the cement kiln.

The cement clinker raw ingredients include a source of calcium carbonate, usually limestone, as a source of calcium for the cement compounds of the cement clinker. The calcium carbonate is thermally decomposed to lime and carbon dioxide in the calcining zone. The carbon dioxide emissions represent a pollution problem as they exit from the kiln, the significance of which has heightened with geopolitical concerns surrounding the Kyoto Accord.

Coal ash is derived from the burning of lignite, bituminous and sub-bituminous coal in power plants; the fly ash is recovered from the exhaust gases of the coal burning plants, and bottom ash is recovered from the bottom of the boiler as a granular coal ash.

Coal ash including class C fly ash has been blended or interground with cement clinker, because of its pozzolanic nature, to produce blended cements or has been used as a pozzolanic admixture in concrete, but has not previously been considered as a source of calcium in the production of cement clinker. Moreover fly ash is formed as very fine particles and is normally utilized in that form, with a minimum of processing. The fine particles can present a handling problem. Bottom ash which can also be used as a source of calcium does not have this problem because of its larger particle sizes.

Fly ash is produced in huge tonnages and while uses have been developed for fly ash, the enormous quantities produced still present a disposal problem.

SUMMARY OF THE INVENTION

It is an object of this invention to employ coal ash as a source of calcium in cement clinker production.

It is a particular object of this invention to employ a coal ash derived predominantly from lignite and sub-bituminous coal as a source of calcium in cement clinker manufacture.

It is a further object of his invention to provide such processes with reduced emissions of carbon dioxide per unit weight of cement clinker produced.

In accordance with the invention there is provided in a method of cement clinker manufacture in which a clinker feed material containing a source of calcium carbonate is fed into a feed end of a cement kiln, the feed material is heat processed in the kiln to produce cement clinker with emission of carbon dioxide from thermal decomposition of the source of calcium carbonate and discharge of the carbon dioxide from the kiln, and cement clinker is discharged from a discharge end of the kiln, the improvement wherein a coal ash derived from burning pulverized lignite or sub-bituminous coal is included in the feed material in said kiln to replace a portion of said source of calcium carbonate in the formation of said cement clinker, with a lowering of the emission of carbon dioxide in said kiln, per unit weight of cement clinker produced.

In another aspect of the invention there is provided a method of producing cement clinker with reduced emission of carbon dioxide from a change of cement clinker raw ingredients comprising:

i) providing a rotary cement kiln having a feed end and a discharge end;

ii) establishing predetermined levels of at least calcium, silicon and aluminium for a cement clinker, based on a raw ingredient feed material comprising a source of calcium carbonate, a source of silicon and a source of aluminium, iii) providing a raw ingredient feed material formulation comprising said sources, in which a portion of said source of calcium carbonate is replaced by a coal ash derived from lignite or sub-bituminous coal while maintaining said predetermined level of calcium;

iv) feeding said formulation into said kiln, v) exposing said formulation to elevated temperatures in said kiln, while feeding said ingredients from said feed end towards said discharge end, to calcine said source of calcium carbonate with formation of calcium oxide and liberation of carbon dioxide, and chemically combine and integrate said calcium oxide with said sources of silicon and aluminium, and said coal ash, as a cement clinker, and vi) discharging said cement clinker from said discharge end, whereby carbon dioxide emissions are reduced in proportion to the replacement of said source of calcium carbonate by said coal ash.

BRIEF DESCRIPTION OF THE DRAWING

Further features and advantages of the present invention will become apparent from the following detailed description, taken in combination with the appended drawing, in which.

Figure 1:
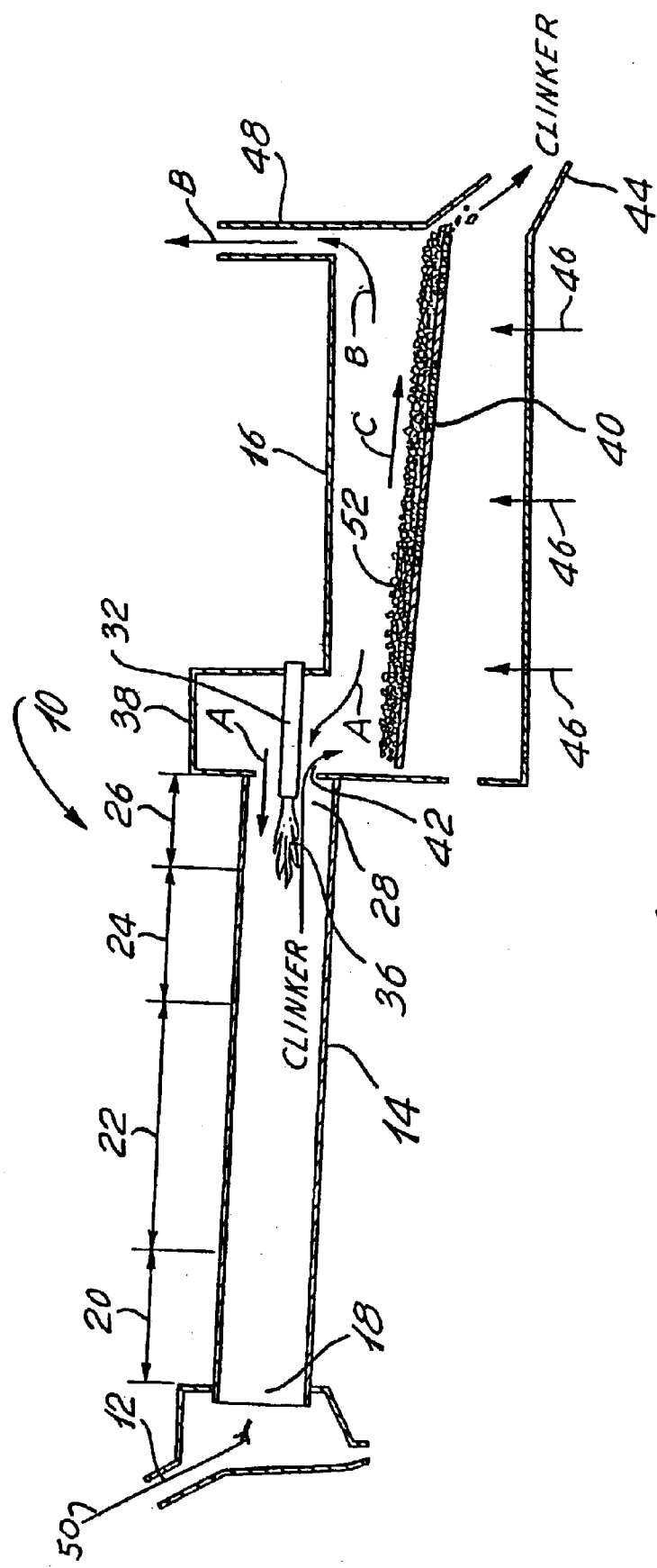
FIG. 1 is a simplified schematic illustration of a kiln assembly including a kiln and a cooler.

DETAILED DESCRIPTION OF THE PREFERRED EMBODIMENT i) Coal Ash

The coal ash as employed in this invention refers to the residue produced in coal burning furnaces from burning pulverized anthracite or lignite, or bituminous or sub-bituminous coal. Such coal ash includes fly ash which is the finely divided coal ash carried from the furnace by exhaust or flue gases; and bottom ash which collects at the base of the furnace as agglomerates.

The coal ash employed in the invention is, more especially, one having a significant content of calcium, particularly a Class C fly ash; or bottom ash similarly having a significant calcium content such as results from burning lignite or sub-bituminous coals in coal burning boilers or furnaces.

The Class C fly ashes referred to above are defined by CSA Standard A23.5 and ASTM C618, both incorporated herein by reference.

The coal ash may typically contain 10 to 40%, more usually 10 to 35%, of calcium determined as calcium oxide. For the purposes of this invention, since the fly ash is being employed as a source of calcium, coal ash of high calcium content especially 20 to 40%, more especially 30 to 40% are preferred, but based on wide availability coal ash having a calcium content of 25 to 35% will more generally be employed.

Coal ashes also have significant contents of silicon, aluminium and iron which are all important elements in cement clinker formation. Typical contents determined as their oxides are silicon 30 to 40%, aluminium 15 to 25% and iron 3 to 8%.

All percentages herein are by weight unless otherwise indicated. It will be understood and readily recognized by persons in the art that calcium, silicon, aluminium and iron are not present as elements in the fly ash or even, necessarily as oxides of the elements, however the weight % of such elements is conveniently and traditionally expressed as oxides whether the elements are actually present as oxides or otherwise.

Typically a majority of the fly ash, at least about 80%, by weight, comprises particles of less than 45 microns.

Bottom ash typically is recovered from the base of the furnace as granules of which 70%, by weight, have a size in the range of 100 microns to 8 cm. It has similar chemistry to the fly ash being from the same coal source and occurs in lesser amounts than the fly ash, typically 10–20% of the coal ash produced.

ii) Process

The process is further described by reference to the embodiment in which the coal ash is a Class C fly ash.

The fly ash is suitably introduced to the feed inlet of the cement kiln so that all or a majority of the fly ash travels with the other cement clinker raw ingredients towards the discharge outlet of the kiln, and is not entrained by exhaust and combustion gases travelling within the cement kiln. In order to achieve this the fly ash may be premixed in its fine particle form, with the other raw ingredients, before being introduced into the kiln. The fly ash may also be fed independently to the cement kiln feed inlet, and in such case the fine fly ash particles may conveniently be agglomerated to larger particles, prior to introduction to the kiln. The fly ash may also be introduced independently into the kiln downstream of the feed inlet but upstream of the zone of the kiln in which clinker formation occurs. Thus the fly ash may be introduced to the kiln in the drying zone or the calcining zone.

In particular the fly ash is introduced to the kiln at a zone upstream of a zone in which heat processing to form cement clinker occurs, and more especially is a zone in which the calcium oxide chemically combines and integrates with the sources of silicon and aluminium to form cement clinker.

One property of Class C fly ash, not present in ashes from bituminous coals, F ashes, is their self cementing properties created by some of the compounds that also occur in cement.

Such agglomeration may be carried out in a conventional agglomerator for fine particle materials, but also to take advantage of the self hardening by adding water to layers of the fly ash and allowing the layers to solidify due to hydraulic behaviour to rock-like layers which may then be crushed to a convenient particle size for handling, for example in the size ranges for sand, gravel and cobbles.

To this end agglomerated fly ash particles in which at least 80% by weight, have a particle size of 0.1 mm to 6 inches, especially 5 mm to 70 mm are convenient for handling in the process of the invention.

Introducing the fly ash in a non-air entrainable state, for example in a water damp or moistened state, is another means of minimizing loss of the fly ash into the emission gases generated in the cement kiln. In this case the damp or moistened fly ash is subjected to drying as it travels with the clinker raw ingredients, and the fly ash is either entrapped in pockets between adjacent clinker ingredient particles or has chemically integrated or combined with the raw ingredient sufficiently downstream in the kiln that it is not entrained by the gases generated in the kiln.

Furthermore since the inclusion of the fly ash as a source of calcium lowers the requirement for calcium carbonate with a consequent lowering of the emissions, especially carbon dioxide, the likelihood of entrainment of fly ash particles by such gas emission reduction is also lowered.

Bottom ash being coarse, it can be introduced into the raw limestone circuit and through the primary grinding mills or as required, introduced at mid kiln through openings/scoops in the kiln shell In particular the coal ash is introduced to the feed inlet or mid kiln if preferred of the kiln for the clinker raw ingredients, such that the coal ash is conveyed with the other clinker raw ingredients towards the discharge outlet, and the coal ash is exposed to a temperature and residence time effective for melting of the coal ash and chemical integration and combination with the other ingredients to form the cement clinker. Since the main elements of a coal ash are calcium, silicon, aluminium, iron and oxygen, the main components of cement clinker are all found in the coal ash but with the additional benefit that the coal ash is previously formed at high temperature and thus does not have thermal decomposition products.

Since the calcium carbonate addition to the kiln, as the prime source of calcium, can be lowered in proportion to the employment of coal ash as a source of the calcium, emissions of carbon dioxide in the kiln can be lowered proportionately.

The final proportions require analysis of the balance of each component, calcium, silicon, alumina and iron, all contributed by the coal ash, and all the other raw materials used by the cement plant to meet the intended class of cement clinker, Types 1,2,3,4,5 and special cements listed in ASTM.

Various delivery means may be employed for introducing the coal ash to the kiln or to the clinker raw ingredients for premixing, and the design and location of suitable delivery means in the upstream of the feed inlet of the kiln is well within the skill of persons in the art. For example, when fly ash is selected, a damp or moistened fly ash may be introduced by a reclaim screw auger, the fly ash could also be pneumatically delivered to the feed inlet and, for example might be pneumatically injected into the interior of the clinker raw ingredients for enhanced commingling with the clinker raw ingredients. Introduction into the interior of the raw ingredients also minimizes possible loss of the fly ash by entrainment in gases generated in the kiln.

Fly ash is commercially available and normally employed in a dry state, in which it is a fine powder. As such it is more difficult to successfully introduce fly ash into the kiln, and retain it with the clinker raw ingredients for combination and integration therewith in the kiln. One would have losses of the fine powder by entrainment in gases flowing in the kiln. Bottom ash would behave differently because of its coarser particles.

The coal ash is suitably introduced to the clinker raw ingredients or directly at the feed inlet of the kiln in an amount to provide 5 to 45%, typically 10 to 30%, by weight, of the calcium content of the cement clinker being produced.

iii) Chemical Processing

In a typical cement clinker production site the raw ingredients for clinker production are assessed prior to introduction into the kiln and proportioned to produce a cement clinker with contents of calcium, silicon, aluminium, iron and other metals in predetermined amounts or ranges, so as to provide a cement clinker for producing a cement of a certain desired class, such as one having early strength during setting, or high ultimate strength.

In accordance with preferred embodiments of the invention, the content of calcium carbonate as a source of calcium, in the clinker raw ingredients is lowered or reduced according to the calcium provided by the coal ash. In this way the balance of calcium desired in the cement clinker is maintained. The reduction in the amount of the source of calcium carbonate, for example limestone, results in a lowering or reduction in the amount of carbon dioxide generated in the kiln per unit weight of cement clinker produced.

The amount of other ingredients in the cement clinker raw ingredients may also be conveniently adjusted in accordance with the desired amounts or ranges for the other elements in the cement clinker, based on the content of these elements in the coal ash, and the amount of fly ash employed as replacement for the source of calcium carbonate.

Brief Description of the Drawing

Further features and advantages of the present invention will become apparent form the following detailed description, taken in combination with the appended drawing, in which:

FIG. 1 is a simplified schematic illustration of a kiln assembly including a kiln and a cooler.

Detailed Description of Preferred Embodiment of the Invention with Reference to the Drawing With further reference to FIG. 1, a kiln assembly 10 includes a feed inlet 12, a rotary kiln 14 and a cooler 16.

The kiln 14 is mounted for rotation relative to feed inlet 12 and cooler 16.

Rotary kiln 14 has a drying zone 20 for use in a wet process, a calcining zone 22, a burning zone 24 and an initial cooling zone 26.

Rotary kiln 14 extends between a feed port 18 and a clinker outlet 28.

A burner assembly 30 mounted externally of kiln 14 has a burner nozzle 32 mounted in a firing hood 38 which nozzle 32 extends through outlet 28 into kiln 14. A flame 36 is developed at nozzle 32.

Cooler 16 has an entry port 42 which communicates with clinker outlet 28 of kiln 14, and an exit port 44. A cooler grate 40 is mounted in cooler 16 and air jets 46 disposed below cooler grate 40 feed jets of cooling air upwardly through cooler grate 40 and a bed 52 of clinker supported on cooler grate 40.

Cooler 16 has an air discharge 48.

Cooler grate 40 comprises a plurality of plates in side-by-side relationship. Some of the plates have openings therethrough to allow passage of the cooling air. Some plates are fixed and other are mounted to oscillate, back and forth. The movement of the oscillating plates agitates the clinker.

The cooler grate 40 is inclined downwardly from the entry port 42 to exit port 44. The bed 52 of clinker is advanced towards exit port 44 by the oscillation of some of the plates, in conjunction with the inclination and the build-up of clinker introduced into cooler 16 from kiln 14.

In operation raw cement clinker ingredients 50 which include a coal ash, in particulate form, are fed through inlet 12 and feed port 18 into kiln 14, where they first enter drying zone 20. The kiln 14 rotates slowly, and is inclined downwardly from port 18 to outlet 28. With the rotation of kiln 14, the ingredients advance slowly and sequentially through drying zone 20, calcining zone 22 and burning zone 24, into which a flame extends from burner nozzle 32. As a variation, the coal ash may be fed through mid kiln access ports or scoops.

In drying zone 20 the temperature typically ranges from 300° C. to 800° C. In calcining zone 22 the temperature typically ranges from 825° C. to 1000° C. and in burning zone 24 the temperature is typically 1400° C. to 1425° C.

Clinker formation is completed in burning zone 24.

Hot clinker produced in kiln 14 is discharged, through clinker outlet 28 and enters cooler 16 at entry port 42 where it falls onto the cooler grate 40 which advances the hot clinker towards exit port 44. The hot clinker falling onto cooler grate 40 forms a bed 52 of clinker particles which typically has a thickness or depth of 6 to 24 inches.

Air is injected under pressure through air jets 46 located below cooler grate 40, the air permeates through plates in the cooler grate 40 and the bed 52, the clinker being progressively cooled by the air from jets 46 as it advances towards exit port 44. The cooler 16 is typically operated under low pressure or partial vacuum and the air permeating upwardly through bed 52 flows either along the path indicated by the arrows A into kiln 14 or along the path indicated by the arrows B exiting from the downstream end of the cooler. The path of travel of the bed 52 is indicated by the arrow C.

EXAMPLE i) Trials

Different formulations of clinker feed ingredients are summarized below in the Table, to demonstrate the variation of contribution of Ca, Al, Si and Fe to the resulting clinker, that can be achieved by replacement of different amounts of limestone (calcium carbonate) by different amounts of coal ash, in accordance with the invention.

|  | $SiO_2$ % | $Al_2O_3$ % | $Fe_2O_3$ % | CaO % | % used |
|---|---|---|---|---|---|
| MIX 1 |  |  |  |  |  |
| Limestone 1 | 12 | 2.8 | 1.5 | 43 | 46 |
| Limestone 2 | 5 | 0.9 | 0.5 | 52 | 43 |
| Ash | 42 | 21 | 5.6 | 11 | 6 |
| Iron |  |  | 56 |  | 0.7 |
| sand | 73 |  |  |  | 4 |
| mix chemistry | 14 | 3.2 | 1.7 | 43 |  |
| clinker chemistry | 22 | 5 | 2.7 | 66 |  |
| C2S | 14.5 |  |  |  |  |
| C3S | 63 |  |  |  |  |
| C3A | 8.8 |  |  |  |  |
| C4AF | 8.22 |  |  |  |  |
| MIX 2 |  |  |  |  |  |
| Limestone 1 | 12 | 2.8 | 1.5 | 43 | 45 |
| Limestone 2 | 5 | 0.9 | 0.5 | 52 | 42 |
| Ash | 35 | 21 | 5.6 | 17 | 11 |
| Iron |  |  | 56 |  | 0.7 |
| sand | 73 |  |  |  | 4 |
| mix chemistry | 13.5 | 3.9 | 1.5 | 43.1 |  |

-continued

|  | $SiO_2$ % | $Al_2O_3$ % | $Fe_2O_3$ % | CaO % | % used |
|---|---|---|---|---|---|
| clinker chemistry | 21 | 6 | 2.4 | 66.6 | |
| C2S | 12.2 | | | | |
| C3S | 63 | | | | |
| C3A | 12 | | | | |
| C4AF | 7.16 | | | | |
| MIX 3 | | | | | |
| Limestone | 6.7 | 0.4 | 0.7 | 51 | 81 |
| Ash | 46 | 17 | 8 | 19 | 18 |
| sand | 90 | | | | 1 |
| mix chemistry | 14.7 | 3.5 | 2 | 44 | |
| clinker chemistry | 22 | 5.2 | 3.1 | 66.2 | |
| C2S | 15 | | | | |
| C3S | 63 | | | | |
| C3A | 8.5 | | | | |
| C4AF | 9.3 | | | | |

Minor oxides are not accounted for in the in the final chemistries summarized in the Table.

What is claimed is:

1. In a method of cement clinker manufacture in which a clinker feed material containing a source of calcium carbonate is fed into a feed end of a cement kiln, the feed material is heat processed in the kiln to produce cement clinker with emission of carbon dioxide from thermal decomposition of said source of calcium carbonate and discharge of the carbon dioxide from the kiln, and cement clinker is discharged from a discharge end of the kiln, the improvement wherein a Class C fly ash derived from burning pulverized lignite or sub-bituminous coal is included in said feed material in said kiln to replace a portion of said source of calcium carbonate in the formation of said cement clinker, with a lowering of the emission of carbon dioxide in said kiln, per unit weight of cement clinker produced, said fly ash comprising fine fly ash particles agglomerated together to agglomerates of 0.1 mm to 6 inches.

2. A method according to claim 1 wherein said fly ash comprises fine fly ash particles agglomerated together to agglomerates of 5 mm to 70 mm.

3. In a method of cement clinker manufacture in which a clinker feed material containing a source of calcium carbonate is fed into a feed end of a cement kiln, the feed material is heat processed in the kiln to produce cement clinker with emission of carbon dioxide from thermal decomposition of said source of calcium carbonate and discharge of the carbon dioxide from the kiln, and cement clinker is discharged from a discharge end of the kiln, the improvement wherein a coal ash derived from burning pulverized lignite or sub-bituminous coal is included in said feed material in said kiln to replace a portion of said source of calcium carbonate in the formation of said cement clinker, with a lowering of the emission of carbon dioxide in said kiln, per unit weight of cement clinker produced, said coal ash providing 5 to 45%, by weight, determined as CaO, of the calcium content of the cement clinker.

4. A method according to claim 3 wherein said coal ash is bottom ash.

5. A method according to claim 3 wherein said coal ash is a Class C fly ash.

6. A method according to claim 5 wherein said coal ash provides 10 to 30%, by weight, determined as CaO, of the calcium content of the cement clinker.

7. A method according to claim 3 wherein said coal ash is introduced to said kiln at a zone upstream of a zone in which heat processing to form cement clinker occurs.

8. A method according to claim 7 wherein said coal ash is introduced to said kiln at said feed end.

9. A method of producing cement clinker with reduced emission of carbon dioxide from a charge of cement clinker raw ingredients comprising:

i) providing a rotary cement kiln having a feed end and a discharge end;

ii) establishing levels of at least calcium, silicon and aluminium for a cement clinker, based on a raw ingredient feed material comprising a source of calcium carbonate, a source of silicon and a source of aluminium, iii) providing a raw ingredient feed material formulation comprising said sources, in which a portion of said source of calcium carbonate is replaced by a coal ash while maintaining said level of calcium;

iv) feeding said formulation into said kiln, v) exposing said formulation to elevated temperatures in said kiln, while feeding said ingredients in a direction from said feed end towards said discharge end, to calcine said source of calcium carbonate with formation of calcium oxide and liberation of carbon dioxide, and chemically combine and integrate said calcium oxide with said sources of silicon and aluminium, and said coal ash, as a cement clinker, and vi) discharging said cement clinker from said discharge end, whereby carbon dioxide emissions are reduced in proportion to the replacement of said source of calcium carbonate by said coal ash.

10. A method according to claim 9 wherein the proportion of said sources of silicon and aluminium in said formulation is adjusted to maintain said levels of silicon and aluminium, in response to the inclusion of said coal ash in said formulation.

11. A method according to claim 9 wherein said fly ash comprises fine fly ash particles agglomerated together to agglomerates of 0.1 mm to 6 inches.

12. A method according to claim 10 wherein said fly ash comprises fine fly ash particles agglomerated together to agglomerates of 5 mm to 70 mm.

13. A method according to claim 9 wherein said coal ash provides 5 to 45%, by weight, determined as CaO, of the calcium content of the cement clinker.

14. A method according to claim 10 wherein said coal ash provides 10 to 30%, by weight, determined as CaO, of the calcium content of the cement clinker.

15. A method according to claim 9 wherein said coal ash is introduced to said kiln at a zone upstream of a zone in which said calcium oxide chemically combines and integrates with said sources of silicon and aluminium to form cement clinker.

16. A method according to claim 9 wherein said coal ash is introduced to said kiln at said feed end.

* * * * *